Feb. 23, 1937.                    W. SIDNEY                    2,071,773
                              WELDING APPARATUS
                             Filed Aug. 16, 1933

INVENTOR
WATSON SIDNEY
BY
Charles McClair
ATTORNEY

Patented Feb. 23, 1937

2,071,773

UNITED STATES PATENT OFFICE 2,071,773

WELDING APPARATUS

Watson Sidney, Bloomfield, N. J., assignor to Radio Corporation of America, a corporation of Delaware Application August 16, 1933, Serial No. 685,331

2 Claims. (Cl. 250—27)

My invention relates to electric welding, and more particularly to improvements in the control of electric welding apparatus.

In the usual electric welding apparatus the energization of the welding transformer during the welding process is controlled mechanically, usually by control contacts which are opened and closed to control the primary circuit of the welding transformer. The currents in the primary circuit of the welding transformer are heavy, and opening the control contacts to interrupt the primary circuit is apt to cause between the contacts severe arcing which wears away the contacts and so affects the adjustment of the control as to change the heat of the weld and produce non-uniform results.

In mechanically controlled electric welding apparatus it is practically impossible to weld thin pieces of metal without burning them and thus affecting the results of any heat treatment the thin pieces may have had; and due to non-uniform currents between the welding electrodes oxidation and discoloration of the work is frequent. Oxidation is particularly objectionable in an element for an electron discharge device such as a radio tube, as oxides adversely affect the operation of the tube and the element can be freed of oxides only by treatment in a hydrogen furnace.

For some kinds of work the welding current may to advantage be merely a flash of current which lasts for only a half or quarter cycle of the usual 60 cycle alternating voltage applied to the primary of the welding transformer, but the fine and accurate control necessary to limit the flow of current to such a short period is not feasible in a mechanically controlled arrangement with moving parts.

The elimination of mechanical control has been attempted by the use of an electron discharge device of the mercury vapor grid controlled rectifier type for the control of electric welding apparatus, but heretofore control by such a device could be obtained only by using rather complicated and costly circuit arrangements, which become even more complicated if the period of welding current flow were decreased to a half or quarter cycle of a 60 cycle current.

An object of my invention is to provide a simple electric welding apparatus capable of producing uniform welds with substantially no oxidation or discoloration of the pieces being welded.

Another object of my invention is to provide an electric welding apparatus which has very accurate control and fine adjustment, and which will hold its calibration indefinitely.

Still another object of my invention is to provide an electric welding apparatus by which thin pieces of metal may be welded without burning them and affecting the results obtained by any heat treatment which they have previously received.

A more specific object of my invention is to provide a welding apparatus with a novel and simple control utilizing an electron discharge device of the mercury vapor or mercury arc grid controlled rectifier type for automatically controlling the welding operation to a very fine degree.

In accordance with my invention, and in one form of a preferred embodiment of it, I connect in series with the primary of the welding transformer an electron discharge device of the mercury vapor grid controlled rectifier type hereinafter more fully described, but in general comprising an envelope which encloses a cathode, anode, and control grid, and which also contains mercury vapor at a low pressure to give the tube the peculiar characteristic that the grid can start the current flow through the tube, but cannot stop it. For a given anode voltage there is a definite and critical grid voltage which will cause the tube to pass current, but after the flow of current once starts the grid cannot limit or stop it, and can regain control only if the current stops, as it will do when the voltage on the anode becomes zero or negative. The critical grid voltage at which the tube will break down and pass current may be either positive or negative with respect to the cathode, depending upon the design of the tube. In one form of my invention, employing a tube in which the critical grid voltage is positive, a charged condenser is connected to the grid and cathode by a switch to impress on the grid a voltage more positive than the critical voltage, whereupon current flows through the tube as long as the voltage on the anode is positive, thus energizing the welding electrodes during one-half cycle of an alternating voltage on the anode. The condenser discharges through the tube when the tube breaks down to pass current, and the current through the tube stops when the voltage on the anode goes to zero or negative. A high resistance leak in series with the condenser prevents loss of the charge on the condenser should the switch be closed at a part of the cycle where the anode voltage is such that the tube will not pass current.

In a modification of my invention I connect in series with the welding transformer the primary of a high impedance transformer which normally prevents a flow of welding current between the welding electrodes. Short circuiting the secondary winding of this high impedance transformer by an electron discharge device of the type above described momentarily eliminates this high impedance, whereupon enough current flows through the primary of the welding transformer to supply welding current to the welding electrodes. In this arrangement it may be desirable to maintain normally on the grid a negative bias which prevents breakdown of the tube, and which may be neutralized by the charge from the condenser to permit the tube to pass current. The direct voltages for charging the condenser and applying a bias to the grid may be obtained from the alternating voltage lines by any well known rectifying arrangement.

Referring to the drawing, Fig. 1 is a digrammatic representation of one embodiment of my invention wherein the electron discharge device directly controls energization of the primary of the welding transformer.

Figure 3:
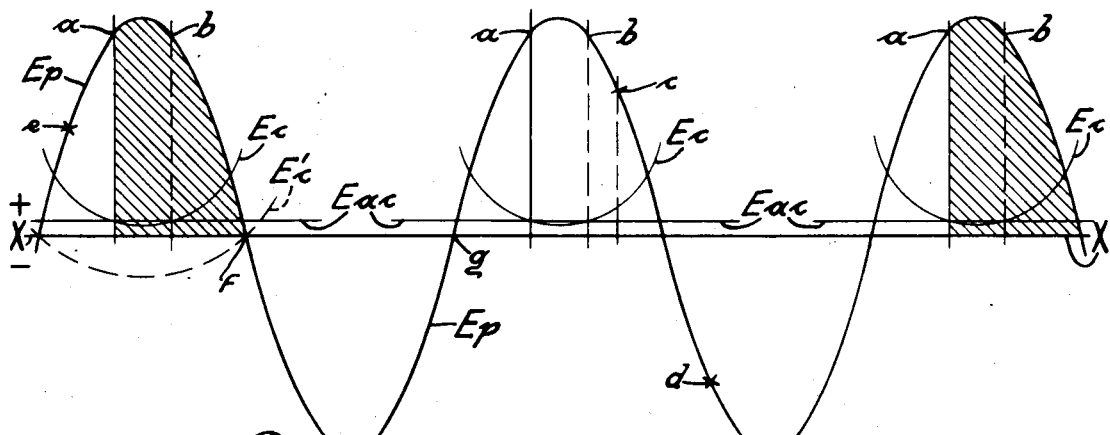
Fig. 3 is a diagrammatic representation of the anode and grid voltages for explaining the operation of my invention.

While electron discharge devices of the mercury vapor grid controlled rectifier type are not new, their operation will be briefly reviewed to assist in a full understanding of my invention. Referring to Fig. 3, the line X—X represents the time axis. The curve designated $E_p$ represents an alternating voltage applied to the anode of the tube. Values above this axis are positive, while those below are negative. The curve $E_c$ represents the critical grid voltages at which the tube will break down and fire. The line $E_{ac}$ represents the voltage applied to the grid by some means, say for example, a charged condenser for causing the tube to break down and pass current. From this diagram it will be apparent that with the voltage $E_{ac}$ applied to the grid that when the anode voltage reaches a value designated at "$a$" on the anode voltage curve which point coincides with the intersection of curves $E_c$ and $E_{ac}$, the tube will break down and pass current and will continue to pass current for the remainder of the positive half cycle, as indicated by the cross-hatched area since after the tube once passes current the grid does not again obtain control of the tube to stop the current until the positive voltage is removed from the anode. It will be apparent that if the voltage applied to the grid were made more positive, which would in effect move the line $E_{ac}$ up from the X—X axis, the tube would "fire" or pass current at a lower anode voltage, moving the point $a$ down and to the left on the anode curve. This would increase the period during which current would pass through the tube. In a tube of the type which requires a negative grid voltage to prevent "firing" of the tube, the curve $E_c$ would in effect be moved down below the X—X axis as represented by dotted line $E'_c$. Applying some grid voltage less negative than this critical grid voltage would cause the tube to pass current.

Figure 1:
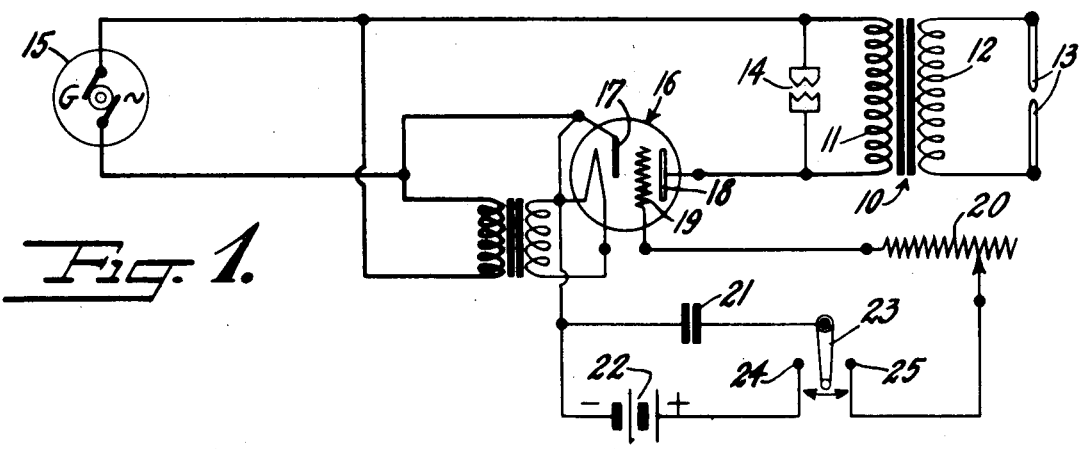

Referring to Fig. 1, the welding transformer 10, of the usual construction, has a primary 11 and a secondary 12 with its terminals connected to the welding electrodes 13. A protective device, such as a lightning arrestor 14, is connected across the primary of the welding transformer to protect it against surge voltages. A source 15 of fluctuating voltage, preferably a 60 cycle alternator, is connected to the primary of the welding transformer through an electron discharge tube 16 of the mercury vapor type above described and having an indirectly heated cathode 17 with its heater connected through the usual transformer to the voltage supply source 15, a cooperating anode 18, and an interposed grid 19 connected to an adjustable resistance grid leak 20, which has a resistance high enough to keep the condenser charged for at least a half cycle. A condenser 21 is so arranged that it may be charged by being connected to a source of direct voltage, such as a battery 22, and discharged through the tube by being connected to the grid 19. In the particular arrangement shown one plate of the condenser is connected to the cathode 17 and to the negative terminal of the battery 22, and the other plate may, through a switch blade 23, be connected at will through a contact 24 to the positive terminal of the battery or through the contact 25 to the grid leak 20 and the grid 19.

Referring now to Figs. 1 and 3, the operation of the form of my invention disclosed in Fig. 1 is as follows:

When it is desired to make a weld, the parts to be welded are clamped between the welding electrodes 13. The condenser 21 is charged by moving the switch blade 23 to the contact 24, whereby the right hand plate of the condenser is charged positive. Then the tube is "fired" and a flash of welding current caused to pass between the electrodes 13 by shifting the switch blade 23 to the contact 25, thus connecting the positively charged plate of the condenser directly to the grid 19 through the leak 20. If the switch blade 23 closes on contact 25 when the anode voltage is at a point represented by "$e$" on the anode voltage curve $E_p$ shown in Fig. 3, and if the voltage applied by the condenser to the grid has a value represented by the line $E_{ac}$, the tube will "fire" and begin to pass current when the anode voltage rises on the positive half cycle to a value represented by the point "$a$", the current continuing to flow for the period determined by the remainder of the positive half cycle of the alternating voltage applied to the anode 18 and to the primary 11 of the welding transformer 10. During this period the condenser discharges through the tube between the grid 19 and cathode 17. The flow of current through the tube 16 and the primary of the welding transformer 10 produces a "flash" of welding current between the electrodes 13.

When the alternating voltage on the plate reaches zero or goes negative, as represented by the portion of the curve between "$f$" and "$g$" on curve $E_p$, the flow of current through the tube stops, thereby limiting the duration of the flash of welding current between the electrodes 13 to a fraction of a half cycle. No more current flows through the tube until the condenser 21 is recharged and the current again started by the grid as above described. A convenient arrangement by which an operator may control the electrodes 13 and switch 23 is, for example, a single lever so arranged that, when pressed, the electrodes 13 grip the parts to be welded, and then the switch blade 23 moves over to the contact 25, the switch blade being biased to return to the contact 24 when pressure is removed from the lever.

The grid is made positive with respect to the cathode 19 when the switch blade 23 is closed on the contact 25 to connect the grid to the charged condenser 21, hence leakage of electrons from the cathode to the positive grid tends to discharge the condenser even though no current flows through the tube. In order to maintain the condenser and grid positively charged until the anode voltage rises high enough to "fire" the tube there is inserted in series with the grid a high resistance leak 20 with a time constant which prevents any material loss of charge on the grid during one cycle.

Referring to the diagram of Fig. 3, if the switch blade 23 is closed on contact 25 at the point c or d on the anode voltage curve $E_p$, the grid will hold its charge until, on the next positive half cycle the anode voltage reaches the critical voltage designated "a" at which the tube will fire. The tube will "fire" if the grid is made positive at any time while the anode voltage is above the critical value and is between the points marked "a" and "b" on the anode voltage curve. If the tube "fires" only at or near the peak of the positive half cycle of the anode voltage, substantially the same welding current will be supplied to each weld, thus producing very uniform welds.

It is apparent that my invention may be practiced with a tube having a negative critical grid voltage, merely by maintaining the grid at a negative voltage less than the critical negative voltage by some negative biasing means until it is desired to "fire" the tube. It is also apparent that my invention can be used for line welding as well as spot welding by automatically moving the switch blade 23 alternately and periodically between contacts 24 and 25.

Figure 2:
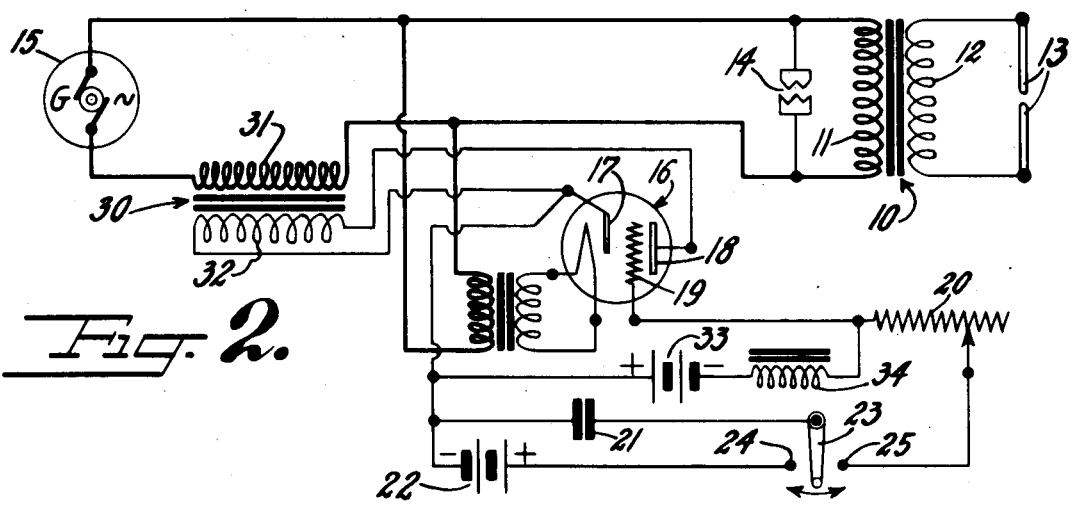
Fig. 2 is a diagrammatic representation of a modification of my invention using a high impedance transformer in cooperation with an electron discharge device for controlling the welding transformer.

In Fig. 2, I show a modification of my invention in which a high impedance transformer 30 has its primary winding 31 connected in series with the primary 11 of the welding transformer 10, so that normally very little, if any current flows through the primary of the welding transformer, and no welding current flows through the secondary winding 12 and/or between the welding electrodes 13. A mercury vapor rectifier tube 16 of the type above described is connected across the secondary 32 of the transformer 30 with the cathode 17 connected to one terminal and the anode 18 to the other terminal of the secondary winding.

The voltage source 15 impresses voltage on the tube elements through the transformer 30. As the voltage between the terminals of the secondary 32 is high, a negative bias on the grid 19 may be necessary to prevent the tube breaking down. One way of obtaining such a negative bias is by a voltage source such as a biasing battery 33 with its negative terminal connected to the grid through a reactance 34 proportioned to prevent the condenser 21 discharging through leak 20 and biasing battery 33 if the switch blade 23 closes on contact 25 when the anode voltage is below the critical value. The tube is "fired" by substantially the same apparatus operating in the same way as in Fig. 1, the charge on the condenser 21 neutralizing the negative charge on the grid and causing the tube to break down and pass current when the switch blade 23 closes on the contact 25. As long as the tube carries current the secondary 32 of the high impedance transformer 30 is in effect short circuited, whereby the impedance of the transformer 30 is so reduced that a large current passes through the primary of the welding transformer 11 and causes welding current to flow between the electrodes 13.

It will be seen that by my invention I provide a reliable and accurate welding apparatus in which the duration of the "flash" of welding current can be controlled within substantially a quarter of a cycle of the alternating voltage applied to the welding transformer. By means of this accurate control I provide uniform welds which are free of oxidation and discoloration and permit welding of thin metal without burning. By my invention a mercury vapor grid controlled rectifier is used in a very simple and inexpensive way to provide accurate control of the welding apparatus. While my invention is particularly suitable for controlling welding apparatus it may be adapted to other devices where definite time control of a momentary flow of heavy current might prove advantageous.

The embodiment of the invention illustrated and described herein has been selected for the purpose of clearly setting forth the principles involved. It will be apparent however that the invention is susceptible of being modified to meet the different conditions encountered in its use and I, therefore, aim to cover by the appended claims all the modifications within the true spirit and scope of my invention.

While I have shown and described a preferred embodiment of my invention, I do not wish to be limited to this particular form, as devices constructed in accordance with the principles of my invention may be made in various forms and modifications without departing from the scope of my invention as set forth in the appended claims.

What is claimed as new is—

1. A translating device, a source of alternating voltage for energizing said translating device, a high impedance transformer having a primary connected in series with said translating device to control energization of said translating device, a thermionic device connected to short circuit the secondary of said high impedance transformer to reduce its impedance when said thermionic device passes a current to permit energization of said translating device, said thermionic device comprising an envelope containing a cathode, anode, and a control grid, and an ionizable medium in said envelope for maintaining a self-sustaining discharge at the impressed voltages, a condenser associated with said thermionic device, means for charging said condenser and means for connecting the condenser between the cathode and the control grid for impressing the charge on said condenser on the control electrode to cause the thermionic device to break down and pass a current whereby said translating device will be energized from said source of alternating voltage.

2. A translating device, a load connected thereto, a source of alternating voltage for energizing said translating device, a high impedance transformer having a primary connected in series with said translating device and said source of alternating voltage for controlling energization of said translating device for normally preventing a current to said load, a thermionic device connected across the secondary terminals of said high impedance transformer to short circuit said secondary when said thermionic device passes a current, said thermionic device comprising an envelope containing a cathode, anode, and a control grid, and an ionizable medium in said envelope for maintaining a self-sustaining discharge at the impressed voltages, a condenser, means for charging said condenser to a critical voltage and means for transferring the charge from said condenser to said control grid for causing said thermionic device to break down and draw a heavy current in the secondary circuit of said high impedance transformer whereby the impedance of said transformer is reduced to permit energization of said translating device from said alternating voltage source.

WATSON SIDNEY.